United States Patent [19]

Fischer et al.

[11] 3,828,329

[45] Aug. 6, 1974

[54] SINGLE WALL DOMAIN PROPAGATION ARRANGEMENT

[75] Inventors: Robert Frederick Fischer, Livingston; James Clayton North; Raymond Wolfe, both of New Providence, all of N.J.

[73] Assignee: Bell Telephone Laboratories Incorporated, Murray Hill, N.J.

[22] Filed: July 24, 1972

[21] Appl. No.: 274,443

[52] U.S. Cl. ..................... 340/174 TF, 340/174 EB
[51] Int. Cl. ............................................ G11c 11/14
[58] Field of Search ............340/174 AD, 174 DA, 340/174 PW, 174 TL, 174 TF

[56] References Cited

UNITED STATES PATENTS

| | | | |
|---|---|---|---|
| 3,602,911 | 8/1971 | Kurtzig | 340/174 TF |
| 3,643,238 | 2/1972 | Bobeck et al. | 340/174 TF |

OTHER PUBLICATIONS

IBM Technical Disclosure Bulletin, Vol. 14, No. 9, Feb. 1972, pg. 2579–2580.

Bell System Technical Journal, July–August, 1972, pg. 1436–1440.

Applied Physics Letters, Vol. 19, No. 8, Oct. 15, 1971, pg. 298–300.

*Primary Examiner*—James W. Moffitt
*Attorney, Agent, or Firm*—H. M. Shapiro

[57] ABSTRACT

A field access, single wall domain propagation arrangement is defined by a pattern of ion implanted regions in a domain supporting layer. Either positive or negative magnetostriction effects result in changing pole patterns for domain movement in response to a magnetic field reorienting in the plane of domain layer.

9 Claims, 10 Drawing Figures

SINGLE WALL DOMAIN PROPAGATION ARRANGEMENT

FIELD OF THE INVENTION

This invention relates to magnetic memory arrangements and more particularly to such arrangements in which information is stored as magnetic single wall domains.

BACKGROUND OF THE INVENTION

U.S. Pat. No. 3,534,347 of A. H. Bobeck discloses a single wall domain memory arrangement in which the domains are moved in a layer of magnetic material in response to a magnetic field rotating in the plane of the layer in what is often called a "field access bubble" arrangement. The rotating field is coupled to domains in the layer by an overlay pattern of magnetically soft elements adjacent a surface of the layer typically separated therefrom, to avoid exchange coupling, by a spacing layer of silicon oxide. The most familiar pattern is of a T and bar form with a period of three to four domain diameters. Each rotation of the in-plane field advances a domain one period. If information is represented as the presence (binary one) or absence (binary zero) of a domain, advancement of information from an input to an output position occurs along a channel defined in the layer by the pattern in response to successive rotations of the field.

Field access devices of this type have a number of virtues which make them particularly attractive for mass memory applications. First, domains exist in the absence of a drive field, and so the memory is "non-volatile." Secondly, propagation, and thus access in a sequential memory, is by means of the rotating field, and thus external connections are reduced to a negligible small number necessary for implementing input, detection, and transfer functions as is now well understood. Third, full advantage may be taken of the latest photolithographic techniques and thus relatively high packing densities can be realized. Because reliability is determined, to a large extent, by the number of external connections, a highly reliable permanent memory is achieved. Because high packing densities are available, low costs are achieved also.

But processing yield is a factor in costs also. Present processes for producing field access bubble memories include crystal growth, slicing, and polishing to prepare a substrate, followed by epitaxial deposition of the domain layer. After that, a spacing layer is formed and the magnetically soft (Permalloy overlay) pattern is formed on the spacing layer by familiar photolithographic techniques. The final step is the formation of the few conductor patterns necessary to achieve the special functions noted above, although it is contemplated to form these conductor patterns with permalloy material as part of the overlay pattern. It should be clear that processing steps are few and yields consequently high.

On the other hand, as increasingly higher packing densities (viz., in excess of $10^7$ bits per square inch) are sought, the resolution capabilities of presently available photolithographic techniques are soon exceeded. Further, there are problems with the processing of Permalloy patterns. To be specific, the properties of Permalloy tend to vary from batch to batch. And the etch rate of Permalloy also varies. These problems require additional testing and classifying of the resulting devices. Consequently, improvements in processing are desired.

Further, stroboscopic techniques have indicated that present overlay patterns are not entirely effective in moving domains at a uniforma speed in a propagation channel and alterative patterns produce wider operating margins with some materials as increasingly higher speeds (viz., in excess of one megacycle in-plane field rate) are achieved.

One approach to the foregoing problems is to find a more controllable coupling arrangement between domains and the rotating drive field of the field access arrangement. Copending application Ser. No. 151,728 of M. Dixon et al. filed June 10, 1971 now U.S. Pat. No. 3,792,452 discloses ion implantation techniques for forming localized modification of layers of material for magnetic domain arrangements.

BRIEF DESCRIPTION OF THE INVENTION

The present invention is based on the discovery that such ion implanted surface regions in the domain layer can be designed to respond to a reorienting in-plane magnetic field to move single wall domains and thus provide an alternative to the Permalloy overlay pattern. Materials for the domain layer are chosen and implanted in a manner to produce one of two classes of arrangements. One of these classes is produced from a domain layer characterized by negative magnetostriction. The layer is formed initially such that the magnetization therein is normal to the plane of the layer. Ion implantation results in a pattern of implanted surface regions where the magnetization is lying in the plane. A reorienting in-plane field is operative to reorient the magnetization in the implanted regions thus producing moving pole patterns, in the field access mode, for moving domains therebeneath. In one specific embodiment an implanted surface region of a domain layer defines a path for domains by the inclusion of closely spaced nonimplanted regions therein. A domain follows the periphery of the implanted regions defined at the interface with the nonimplanted regions.

In the second class of arrangement, a domain layer characterized by positive magnetostriction is used. In cases of this type, the domain layer is initially characterized by an in-plane magnetization and the implanted regions are characterized by a magnetization normal to the plane of the layer. A domain again follows the periphery of the implanted region.

DETAILED DESCRIPTION

Figure 1:
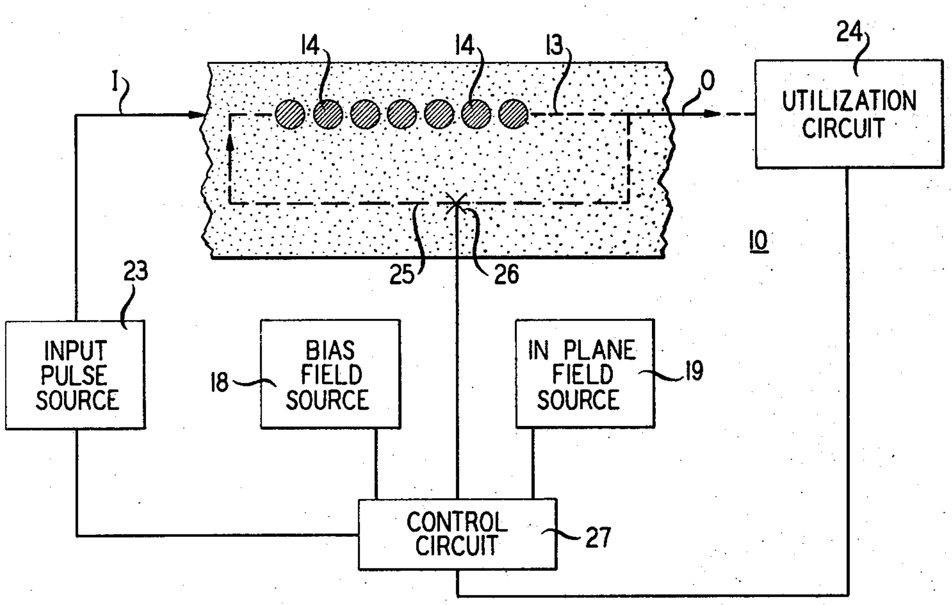
FIG. 1 is a schematic representation of a multistage domain propagation arrangement in accordance with this invention.

FIG. 1 shows a domain propagation arrangement 10 including a layer 11 of a material in which single wall domains can be moved. A propagation path 13 for domains is defined illustratively by ion implantation of the surface of layer 11 except in localized areas shown as circular portions 14.

Figure 2:
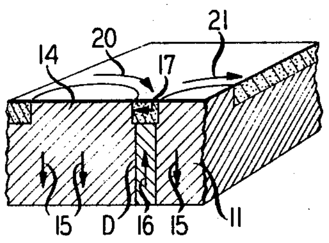
FIGS. 2, 4, 5A, 5B, and 6 through 9 are schematic cross section and top views of alternative portions for the arrangement of FIG. 1 showing the position of a domain therein.

A representative circular portion is shown in the cross-sectional view of FIG. 2. The implanted region is shown stippled to distinguish from the remainder of layer 11 in both FIGS. 1 and 2. Arrows 15 represent the magnetization in the bulk portion of layer 11; arrow 16 represents the magnetization in a representative domain D. It is to be noted that the magnetization of layer 11 is normal to the plane of layer 11, that of domain D being directed upward. The magnetization of the implanted region, on the other hand, is in the plane of layer 11. Arrow 17 represents that magnetization and can be seen to be lying in the plane of layer 11 in FIG. 2.

A plot of magnetic domain energy E versus distance S along layer 11 shows an energy maximum at the edge of a nonimplanted portion and an energy minimum just outside the edge of that portion. A domain, having a preselected operating diameter, moves in a path defined by the energy minimum. The operating diameter of a domain is determined by a familiar bias field supplied by source 18 of FIG. 1.

Movement of a domain is caused by a magnetic field reorienting, illustratively rotating, in the plane of layer 11. The magnetization in the implanted surface regions rotates with the in-plane field thus producing a pole configuration which causes a localized gradient in the bias field. As the in-plane field direction changes, the pole configuration and thus the bias field gradient changes determining consecutive movements of a domain. The in-plane field is supplied by source 19 of FIG. 1.

Figure 4:
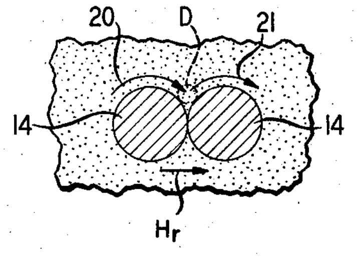

For an assumed clockwise rotation of the in-plane field, a domain can be thought of as moving from left to right as viewed in FIG. 1 along the top periphery of the portion 14. The movement of a domain D in this manner is indicated by curved arrow 20 in FIGS. 2 and 4 and can be understood to be analogous to the movement of a domain about a Permalloy disk generator as disclosed in A. J. Perneski, U.S. Pat. No. 3,555,527 issued Jan. 12, 1971. Such movement occurs as the in-plane field rotates from a leftward direction clockwise to a rightward direction indicated by the arrow $H_r$ in FIG. 4. But as the in-plane field begins to reorient again to the left it generates poles which maintain domain D virtually at the fixed position shown in FIG. 4 until the field is next reoriented to the left. During the next half cycle, domain D advances to the right along the path represented by curved arrow 21.

Portions 14 are chosen typically with diameters equal to three to four domain diameters to avoid domain interaction. The portions may be understood to define stages in the channel, and each stage is operative to move a domain as described as the in-plane field rotates. If a domain is absent from a stage, that absence of a domain is advanced similarly thus providing a useful sequential information store.

Information is moved in this manner from an input position represented by arrow I in FIG. 1 to an output position represented by arrow O there. An adaptation of the above-mentioned generator of Perneski is suitable for an input, the generator being implemented, for example, by separating the two left-most portions 14 in FIG. 1 to permit rotation of a seed domain thereabout with a "cutting" conductor associated with the generator in a familiar manner. Such a conductor is connected to an input pulse source 23 of FIG. 1 and is operative to separate an information domain from the seed when pulsed.

Domains selectively generated and moved, as described, pass output position O where a detecting element such as a magnetoresistance device (not shown) is situated for applying a signal, representative of a domain, to utilization circuit 24 in FIG. 1. It is convenient in single wall domain devices to operate in a closed loop fashion where a domain so detected recirculates to the input position as indicated by broken arrow 25 in FIG. 1. In a recirculating channel of this type, a domain annihilator represented by the *x* symbol in FIG. 1, designated 26, may be employed in a familiar manner.

Sources 18, 19 and 23, and circuit 24 as well as annihilator 26 are connected to a control circuit 27 for activation and synchronization of, for example, input signals and interrogation signals with the in-plane field. The various sources and circuits may be any such elements capable of operating in accordance with this invention.

As has been mentioned hereinbefore, the copending application of M. Dixon et al discloses ion implantation and materials and conditions for producing consistent ion implanted systems. The present invention is based on the discovery that such ion implanted structures can be designed for moving domains in the presence of a reorienting in-plane field when the implanted regions are of geometries to produce changing pole patterns to this end.

Figure 5A:
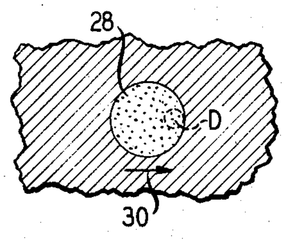
Figure 5B:
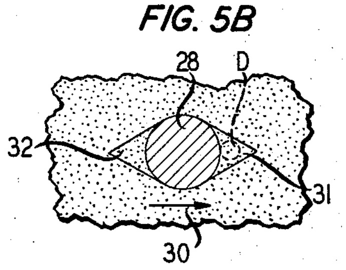

FIGS. 1–4 depict an embodiment where ion implantation occurs over the entire domain layer surface except for well-defined localized areas. Alternatives do exist. For example, only localized areas need by implanted. In one such case, portions 14 of FIG. 1, rather than the remainder of the surface of layer 11, are implanted. FIG. 5A shows such an arrangement where an illustrative portion 28 of a domain layer is ion implanted. FIG. 5B shows an illustrative portion of FIG. 1 where all but portion 28 is ion implanted for comparison. A peculiarity of the arrangement of FIGS. 1–4 and 5B lies in the fact that, contrary to expectation, a domain occupies a position equivalent to that which it would normally occupy if a permalloy (or an ion implanted) disk were used. For example, if the in-plane field is directed to the right as shown by arrow 30 in FIGS. 5A and 5B, a domain D occupies a position to the right of portion 28. The reason for the unexpected position in FIG. 5B lies apparently in the formation of closure domains 31 and 32 which are poled (in the plane of layer 11) oppositely to the field.

Figure 3:
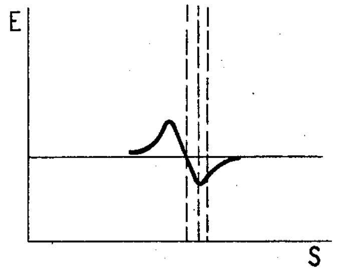
FIG. 3 is an energy diagram for the portion of FIGS. 2 and 4.

The foregoing alternatives contemplate domain layers of negative magnetostriction. The term "negative magnetostriction" herein characterizes a layer which exhibits a magnetization in the plane of the layer when in compression. An implanted region of the domain layer occupies more volume than a nonimplanted region. Since the region is constrained, enlargement of the volume of the region laterally is not possible. Consequently, the region is in compression resulting in a change in the magnetization to the in-plane direction and a strain induced energy minimum at the edge of the region as shown in FIG. 3.

Figure 6:
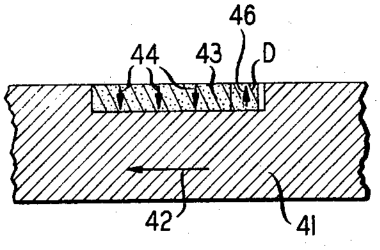
Figure 7:
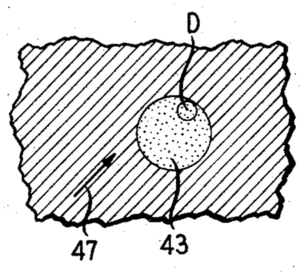

But positive magnetostriction systems can be achieved also. The term "positive magnetostriction" characterizes a region which exhibits a magnetization normal to the plane of the region when in compression. FIGS. 6 and 7 show such an arrangement where the magnetization in a domain layer 41 is initially in the plane of the layer as indicated by arrow 42. An ion implanted region 43 in the positive magnetostriction system results in the magnetization being normal to the domain layer represented by the downward directed arrows 44 in FIG. 6. A single wall domain D is formed in region 43 by the localized reversal of the magnetization as represented by the upward directed arrow 46. A domain in this instance follows the periphery of region 43 in response to a reorienting in-plane field (arrow) 47 as shown in FIG. 7. But when FIG. 7 is compared to FIG. 5B it is readily apparent that the domain in FIG. 5B follows a path to the outside of that periphery whereas the domain in FIG. 7 follows a path to the inside. The domain is in a position corresponding to the implanted region in either case.

A considerable amount of design flexibility is permitted by propagation elements defined by ion implantation as can be seen from the foregoing. But a primary advantage of the resulting arrangements is the high degree of control of the processing techniques and the resulting reproducibility. Permalloy patterns, for example, vary from batch to batch in important properties such as coercivity. Moreover, harmful pinholes occur in permalloy. Also the etching of permalloy is not entirely controlled. These various imponderables are overcome by selection procedures which are costly. Although the resulting yields are adequate for device fabrication, a higher degree of control certainly would improve yields and thus reduce costs. The above-mentioned copending application of M. Dixon et al. discloses the material systems, depth of penetration, sources, intensities, etc., useful for realizing devices of a type in accordance with this invention. It is important to realize further that those techniques offer the desired high degree of control over the various processing parameters.

We have indicated, also, that considerable flexibility is achieved in design herein. The flexibility results from the choice of implanted regions, the choice of positive and negative magnetostriction, and the geometry of the various regions. The various permutations lead to alernatives not possible in Permalloy field access systems. With an eye toward uniform domain motion, new possibilities for exploration are presented.

Figure 8:
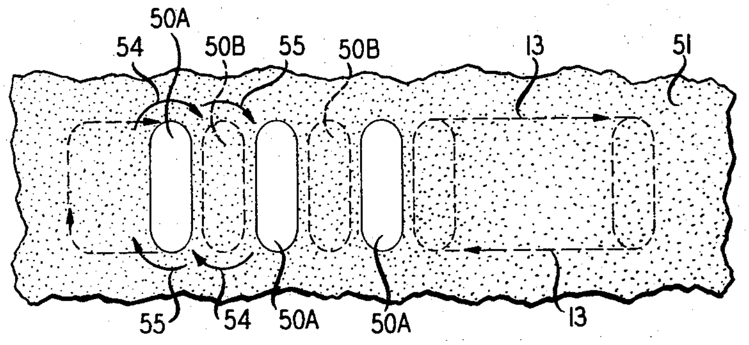
Figure 9:
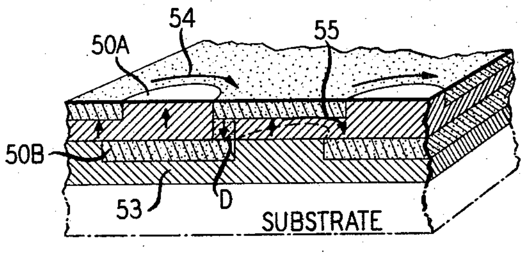

One such possibility is shown in FIGS. 8 and 9. Although, the embodiment of FIGS. 1–4 provides domain motion over only one half cycle of the in-plane field, for example, oval-shaped regions of nonimplanted regions 50A in an otherwise implanted domain layer 51, interleaved with similar nonimplanted regions such as 50B in an adjacent layer 53 of a double layer domain film, provide uniform domain motion over a full cycle of the in-plane field. A domain D of FIG. 9 in this case would follow first the path of arrow 54 then the path of arrow 55, the two circular regions defining one stage along say path 13 of FIG. 1. The operation of this arrangement is entirely analogous to the operations described in the embodiments of FIG. 4 and FIG. 5B. The oval rather than the circular shape shown is employed to isolate opposite sides of a closed loop path and to ensure that a domain does not change sides during operation. Typically the lower layer is of lower movement than the upper layer.

The double layered structure emphasizes further advantages of ion implanted structure in that no nonplanar geometries are introduced and only one type of domain is permitted (viz: no bubble isomers).

In one specific example, in accordance with an aspect of this invention, an epitaxial film of $Gd_{1.0}Y_{1.0}Tm_{1.0}Fe_{4.3}Ga_{0.7}O_{12}$ was formed on a nonmagnetic single crystal garnet substrate cut to provide a 111 deposition surface for an epitaxial domain film. The film was 6 microns thick and exhibited domains with diameters of between 9 and 3 microns ($\mu$m) in a bias field ranging from 90 oersteds to 113 oersteds respectively. Protons from an accelerator were implanted into the domain layer at 100 KeV to a dose of $2\times10^{16}/cm^2$. A photoresist pattern served as an ion implantation mask to prevent the recirculating loops, defined as shown in FIG. 1, from being implanted. The ion implantation occurred to a depth of 0.6 $\mu$m. Portions 14 were 25 $\mu$m in diameter. Propagation of domains was achieved in response to a reorienting field of 33 oersteds at 100 kilocycles. The 111 plane of deposition resulted in a magnetic easy plane within the implanted region.

What has been described is considered only illustrative of the principles of this invention. Therefore, various embodiments can be devised by those skilled in the art in accordance with those principles within the scope and spirit of this invention.

What is claimed is:

1. Magnetic domain propagation apparatus comprising a layer of material in which single wall domains can be moved, and a pattern of ion implanted regions in said layer said pattern having a geometry for defining therein a multistage path for movement of domains therealong in response to a periodic magnetic field reorienting cyclically in the plane of said layer.

2. Apparatus in accordance with claim 1 wherein said layer comprises a first surface and said regions are at said surface.

3. Apparatus in accordance with claim 2 wherein said layer has a magnetization normal to the plane of said layer and said ion implanted regions have in-plane magnetization.

4. Apparatus in accordance with claim 2 wherein said layer has an in-plane magnetization and said regions exhibit magnetization normal to the plane.

5. Apparatus in accordance with claim 2 wherein said layer comprises negative magnetostriction material.

6. Apparatus in accordance with claim 2 wherein said layer comprises positive magnetostriction material.

7. Apparatus in accordance with claim 2 wherein said layer adjacent said first surface is ion implanted except for a periodic pattern of nonimplanted regions which define said path at the interface with the implanted portions of said layer.

8. Apparatus in accordance with claim 1 wherein said layer comprises first and second sublayers each having a first surface, first and second periodic patterns of spaced apart ion implanted regions in said first and second sublayers at said first surfaces, said patterns being offset from one another in a manner to move single wall domains along said path in response to said in-plane field.

9. Apparatus in accordance with claim 2 also including means for supplying said in-plane field.

* * * * *